No. 763,500. PATENTED JUNE 28, 1904.
J. MORIG.
STEERING MECHANISM FOR VEHICLES.
APPLICATION FILED MAR. 18, 1904.
NO MODEL.
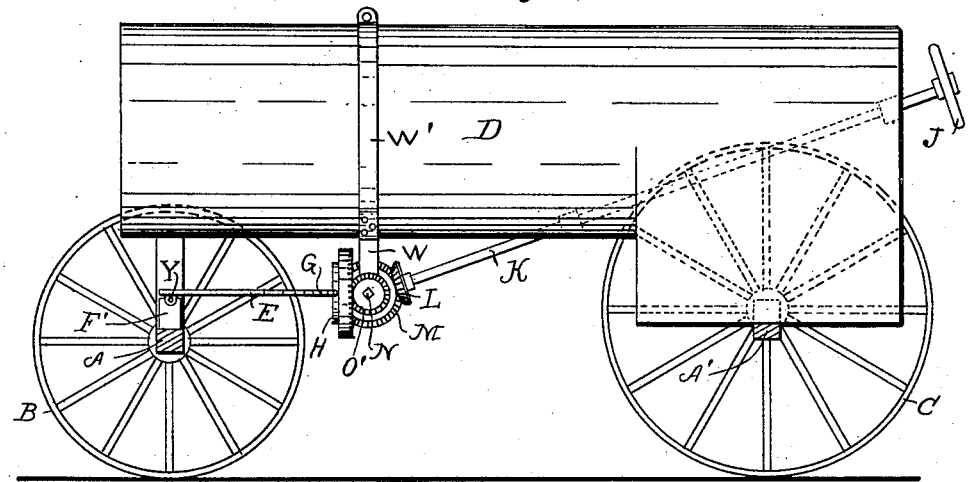
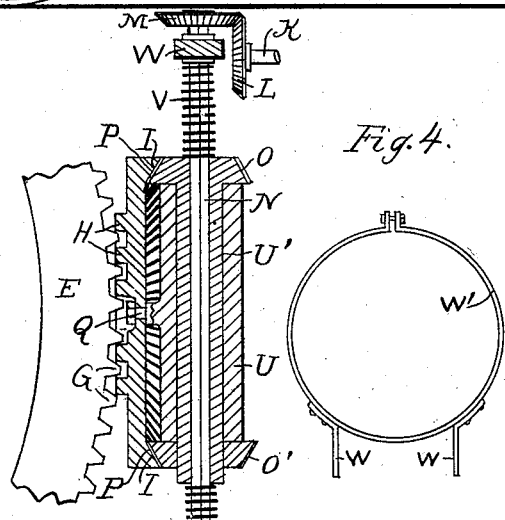
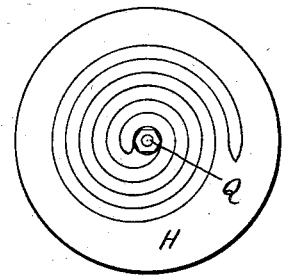
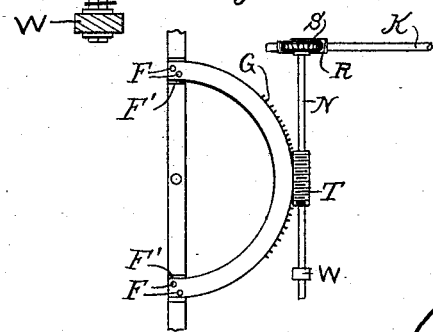
WITNESSES:
INVENTOR
John Morig
BY
ATTORNEYS No. 763,500.

Patented June 28, 1904.

UNITED STATES PATENT OFFICE.

JOHN MORIG, OF BLACK EARTH, WISCONSIN.

STEERING MECHANISM FOR VEHICLES.

SPECIFICATION forming part of Letters Patent No. 763,500, dated June 28, 1904.

Application filed March 18, 1904. Serial No. 198,702. (No model.)

*To all whom it may concern:*

Be it known that I, JOHN MORIG, a citizen of the United States, residing at Black Earth, county of Dane, and State of Wisconsin, have invented new and useful Improvements in Steering Mechanism for Vehicles, of which the following is a specification.

My invention relates to improvements in steering mechanism of vehicles, and it pertains more especially to that class with which traction-engines and steam-boilers are used, and the same is explained by reference to the accompanying drawings.

Figure 1 represents a side view of a vehicle provided with my steering mechanism. Fig. 2 represents a top view of the preferred form of the steering mechanism removed from the vehicle. Fig. 3 represents a front view of one of the gears provided with a spiral flange forming a part of the gear mechanism shown in Fig. 2. Fig. 4 represents a clamping-band for supporting the gear mechanism. Fig. 5 represents a modified form of gear mechanism.

Like parts are identified by the same reference-letters throughout the several views.

A represents the front and A' the rear axle.

B represents the front and C the rear axle-supporting wheels of the vehicle.

D represents a boiler of ordinary construction which is connected with the axles of the vehicle in the ordinary manner.

My steering mechanism comprises a semicircular gear-plate E, which is affixed at its respective ends near the respective ends of the front axle A by bolts F and transversely-arranged bearings F'. The plate E is provided on its periphery with a series of gear-teeth G G, which in the preferred form shown in Fig. 2 are adapted to mesh with the spiral flange H, formed on the opposing surface of the gear-wheel I.

J is a hand-wheel by which the steering mechanism is operated. Motion is communicated from the hand-wheel J to the gear-wheel I through the shaft K, bevel-gears L and M, shaft N, and bevel-gear O, which bevel-gear O meshes with the internal teeth P of the gear I. Thus it is obvious that as the hand-wheel J is turned said gear I will be caused to revolve on its central axis or trunnion Q when motion is communicated from the spiral flange H to the semicircular plate E by the action of said spiral flange H upon the series of teeth G of said gear-plate, whereby the axle A, to which said semicircular plate is attached, is inclined at any desired angle to the longitudinal center of the vehicle and the vehicle guided in any desired direction.

In the modified form shown in Fig. 5 the lower end of the shaft K is provided with a worm-gear R, and one end of the shaft N is provided with a worm-gear S, adapted to mesh in the gear R of said shaft K, and said shaft N is provided at its center with a worm-gear T, which is adapted to mesh with the gear-teeth G, formed on the periphery of said semicircular plate E, whereby as said shaft K is revolved in either direction motion is communicated therefrom through said gears and shaft to said semicircular plate E and from thence to the axle A, whereby said axle is turned and the vehicle guided. The trunnion Q is supported from the shaft N upon a sleeve U, the sleeve U is supported upon the sleeve U', and the sleeve U' is supported upon the shaft N. The gear O is cast integrally with the sleeve U'. Said gear and sleeve are provided with a rectangular aperture which is fitted upon the rectangular shaft N, whereby the gear O and sleeve U' revolve with said shaft, while the gear O' turns freely upon the sleeve U', and both gears and both sleeves are free to move longitudinally upon said shaft N a slight distance between the spiral springs V V, said springs V being interposed between said gears O and O' and the hangers W W and serve to relieve the gear mechanism from the shock of contact incident to the vibratory movement of the axle and semicircular plate E, which they might otherwise receive as the vehicle is being driven over uneven surfaces.

Heretofore it has been common to secure the gears comprising the steering mechanism in direct contact with the boiler, whereby it is difficult to remove the same, as may be required, for repairs. By my improvement, however, I preferably suspend the gears of the steering mechanism beneath the boiler by a clamping-band W', which passes over and around the body of the boiler and is connected at its lower side with the respective ends of the shaft N by said hangers W, the lower ends of said hangers W serving as bearings for the outer ends of the spiral springs V, as indicated.

While I have described a semicircular plate E as being connected with the axle A by bolts F, as shown in Fig. 5, said semicircular plate E may, if desired, be connected with the axle A by a hinge or pivotal connection Y and the intermediate bearings F'.

Having thus described my invention, what I claim as new, and desire to secure by Letters Patent, is—

1. In a steering mechanism for vehicles, the combination of a semicircular gear-plate affixed at its respective ends to the front axle of a vehicle upon the respective sides of the axle-center; a gear mechanism slidably supported upon a horizontally-arranged shaft in connection with said semicircular gear-plate, resilient bearings located upon the respective sides of said gear mechanism and adapted to hold said gear mechanism yieldingly in place in operative connection with said semicircular gear-plate, an operating hand-wheel; means for communicating motion from the operating hand-wheel to said gear mechanism and means for suspending said gear mechanism from the periphery of the boiler, substantially as set forth.

2. In a steering mechanism for vehicles, the combination of a semicircular gear-plate affixed at its respective ends to the front axle of the vehicle upon the respective sides of the axle-center; an operating hand-wheel; means for communicating motion from said hand-wheel to said semicircular gear-plate comprising a longitudinally-arranged shaft; a transversely-arranged shaft located at the lower end of said longitudinal shaft; bevel-gears for connecting the ends of said shafts together; two bevel-gears located on said transversely-arranged shaft, one of which is provided with angular bearings fitted upon corresponding angular bearings of said shaft and the other bevel-gear being provided with cylindrical bearings fitted to corresponding bearings of said shaft; a trunnion-supporting sleeve interposed between said last-mentioned bevel-gears; an internal bevel-gear supported from the trunnion of said sleeve provided with a spiral flange adapted to engage in the teeth of said semicircular gear-plate, whereby as said internal bevel-gear is revolved upon its supporting-trunnion through the mechanism described by turning the operating-handle, motion is communicated to said semicircular gear-plate and from thence to the plate-supporting axle, all substantially as and for the purpose specified.

3. The mechanism herein described for steering vehicles, consisting in the combination with the front axle of a semicircular gear-plate E affixed at its respective ends to said axle; an operating-handle J; means for communicating motion from the operating-handle J to said semicircular gear-plate comprising the supporting-sleeve U', bevel-gear I provided upon its rear side with a spiral flange H adapted to mesh with the teeth of said semicircular plate E; bevel-gear O' having cylindrical bearings upon its supporting-shaft and means for holding said bevel-gears O and O' yieldingly in contact with the gear-supporting sleeve U, all substantially as and for the purpose specified.

In testimony whereof I affix my signature in the presence of two witnesses.

JOHN MORIG.

Witnesses:
   VERNIE CLARK,
   ULRA D. WOOD.